United States Patent [19]

Derezinski

[11] Patent Number: 5,314,246
[45] Date of Patent: May 24, 1994

[54] INCREASED BARREL-STRESS EXTRUDER

[75] Inventor: Stephen J. Derezinski, Penfield, N.Y.

[73] Assignee: Eastman Kodak Company, Rochester, N.Y.

[21] Appl. No.: 98,186

[22] Filed: Jul. 28, 1993

[51] Int. Cl.⁵ .......................... B29B 1/06; B01F 7/08
[52] U.S. Cl. ...................................... 366/79; 366/318
[58] Field of Search .............. 366/79, 81, 83, 88, 366/89, 90, 97, 318, 321, 322, 323; 425/208, 209

[56] References Cited

U.S. PATENT DOCUMENTS

| | | | |
|---|---|---|---|
| 3,461,497 | 8/1969 | Geyet | 18/12 |
| 3,503,944 | 3/1970 | Wisseroth et al. | 260/88.2 |
| 3,752,449 | 8/1973 | Schwab et al. | 259/191 |
| 3,888,469 | 6/1975 | Geyer | 366/79 |
| 3,932,086 | 1/1976 | Kasamatsu | 425/208 |
| 3,946,998 | 3/1976 | Menges et al. | 359/191 |
| 4,045,185 | 8/1977 | Azemar et al. | 23/290 |
| 4,131,368 | 12/1978 | Iddon | 366/318 |
| 4,215,978 | 8/1980 | Takayama et al. | 425/190 |
| 4,408,888 | 10/1983 | Hanslik | 366/83 |
| 4,632,795 | 12/1986 | Huber et al. | 264/115 |
| 4,642,041 | 2/1987 | Murphy | 425/208 |
| 4,798,473 | 1/1989 | Rauwendaal | 366/89 |
| 5,017,015 | 5/1991 | Schlumpf et al. | 366/82 |
| 5,020,915 | 6/1991 | Julien | 366/89 |
| 5,044,489 | 9/1991 | Barsk et al. | 198/666 |

Primary Examiner—Robert W. Jenkins
Attorney, Agent, or Firm—Clyde E. Bailey

[57] ABSTRACT

An extrusion apparatus 10 for extruding thermoplastic materials comprises a hollow cylindrical barrel 12 having a preferably smooth inner cylindrical wall 14. An extrusion screw 16 is mounted for rotation about an axis 18 within hollow barrel 12. The extrusion screw 16 has a major diameter, a minor diameter defining a minor circumferential surface (MCS) of the screw 16, and material pushing threads that are spaced axially and have a normal height 'h' extending outwardly from the MCS of the screw into rotatable contact with the inner cylindrical wall 14 of the barrel 12.

6 Claims, 1 Drawing Sheet

INCREASED BARREL-STRESS EXTRUDER

BACKGROUND OF THE INVENTION

The present invention relates to an extrusion apparatus for extruding thermoplastic material. In particular, the present invention relates to a barrel and screw extrusion apparatus for extruding solid plugs of polymer resin.

As disclosed for example in the following patents, barrel and screw type extrusion apparatus are well known, and specific embodiments thereof have been provided for solving various material extrusion problems, or for meeting various material extrusion objectives.

In U.S. Pat. No. 3,461,497 issued Aug. 19, 1969 to J. W. Geyer, a barrel and screw extrusion apparatus is disclosed for handling a wide variety of extrudable materials. The disclosed apparatus includes a screw that has generally saw-tooth shaped threads which face in the direction of material advance.

To optimize the mixing of material being extruded, U.S. Pat. No. 3,946,998 issued Mar. 30, 1976 to Menges et al, discloses an extrusion apparatus that includes an improved screw. The improved screw has partial screw thread sections for irregularly dividing and thereby mixing material being extruded.

In order to reduce stress and overheating, U.S. Pat. No. 4,408,888 issued Oct. 11, 1983 to Hanslik discloses an extrusion apparatus that includes conically shaped, double-worm screws.

U.S. Pat. No. 4,215,978 which issued Aug. 5, 1980 to Takayama et al discloses a resin molding screw that improves blending and melting of resin material. The screw includes a minor diameter surface that has wavy contoured portions and barriers.

To minimize pressure which opposes material flow, U.S. Pat. No. 4,642,041 issued Feb. 10, 1987 to Murphy discloses an extruder screw that includes a feed section, a transition section, a metering section, and a plurality of back flow seals.

U.S. Pat. No. 5,020,915 issued Jun. 4, 1991 to Julien discloses an extrusion screw that includes a helical thread having a trapezoidal profile, a flat thread crest and inclined flanks for increasing flight width. Increasing the flight width increases compression of the material being extruded, thereby resulting in proper material homogeneity.

Despite the various improvements represented by the above examples; an almost universal objective that remains to be accomplished is increasing the rate and stability of extruded material flow. In this respect, it has been found by the applicants for example that in a barrel and screw extruder, in order to increase material feed pressure as well as increase the rate and stability of the flow or throughput of material being extruded, the stress between the material and the barrel surface should be made greater than the stress between such material and the minor circumferential surface of the screw. In other words, the force between material, for example a solid resin feed plug, and the barrel, should be greater than the force between such material and the extrusion screw. In fact, the greater the difference between these two forces, the greater will be the feed pressure, the material flow rate and flow stability.

There is therefore a need for a relatively inexpensive extrusion apparatus that attempts to achieve such a maximization of this difference between these extrusion forces, and to do so without fouling subsequent batches of material being extruded.

SUMMARY OF THE INVENTION

It is, therefore, the object of the present invention to provide a barrel and screw extrusion apparatus in which a difference between forces by the barrel on the material and those by the minor diameter surface of the screw on the material is maximized.

It is also an object of the present invention to provide a barrel and screw extrusion apparatus that ordinarily does not foul subsequently extruded material.

It is yet another object of the present invention to provide a barrel and screw extrusion apparatus in which material wedging at the root of a screw thread is prevented.

In accordance with the present invention, an extrusion apparatus is provided for extruding thermoplastic material in a given direction of material flow. The extrusion apparatus includes a drive assembly; a hollow cylindrical barrel that has an inner cylindrical wall, and an extrusion screw which is mounted rotatably about an axis within the hollow barrel. The extrusion screw has a major diameter, a minor diameter defining a minor circumferential surface (MCS) of the screw, and material pushing threads that are spaced axially and have a normal radial height 'height' extending outwardly from the MCS of the screw into rotatable contact with the inner cylindrical wall of the barrel.

Adjacent threads of the screw are spaced axially a desired distance '$\lambda$' from each other and define a material holding cavity having an axial length '$\lambda$'. The cavity is bounded in part by the MCS and the inner cylindrical wall of the barrel. Each thread of the screw has a downstream material pushing flank surface, relative to the direction of material flow, that is inclined in an upstream direction to form a material moving angle of greater than 90° with the MCS of the screw. The material moving angle is such that a major axis of stress from a point at '$h$'/2 on the downstream flank surface of a thread is normal to such surface and intersects the inner cylindrical wall of the barrel at a point '$\lambda$'/2 within a material holding cavity downstream of such thread.

BRIEF DESCRIPTION OF THE DRAWINGS

In the detailed description of the invention presented below, reference is made to the drawings, in which.

DETAILED DESCRIPTION OF THE INVENTION

Because extrusion apparatus are well known, the present description will be directed in particular to elements of such apparatus which form part of or cooperate more directly with the present invention. Elements not specifically shown or described are selectable from those known in the prior art.

Figure 1:
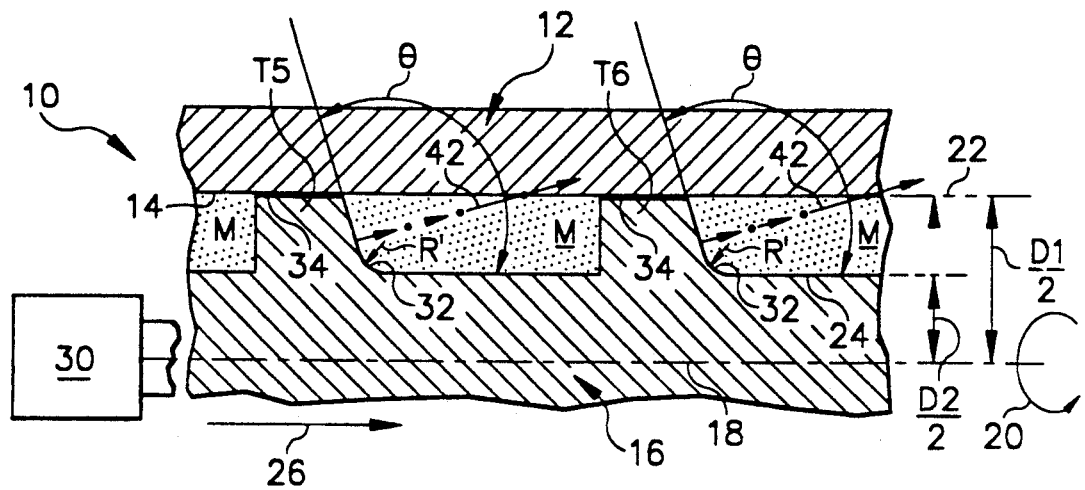
FIG. 1 is a partial section of the extrusion apparatus of the present invention showing the material holding cavity and a pair of inclined downstream flanks thereof.

Referring now to FIG. 1, a characteristic portion of a feed section of the extrusion apparatus of the present invention is shown generally as 10 and includes a hollow cylindrical barrel 12 that has an inner cylindrical wall 14. Preferably, the surface of the wall 14 is generally smooth and has no grooves or significant disturbances which ordinarily would result in a build up of material therein and hence fouling of subsequently extruded material.

The extrusion apparatus 10 also includes an extrusion screw 16 that is mounted for rotation about an axis 18, as shown by the arrow 20, within the hollow barrel 12. As shown, the extrusion screw 16 includes a major diameter D1 (D1/2 is shown) that defines a major circumference path 22 of the screw 16. Screw 16 also includes a minor diameter D2 (D2/2 is shown) that defines a minor circumference surface 24 that is generally parallel to the axis of rotation 18. The screw 16 further includes material pushing threads, for example those shown as T5 and T6, for pushing material M in a given direction of material flow shown by the arrow 26. As indicated, the screw 16 is rotatable by a drive assembly 30.

Figure 2:
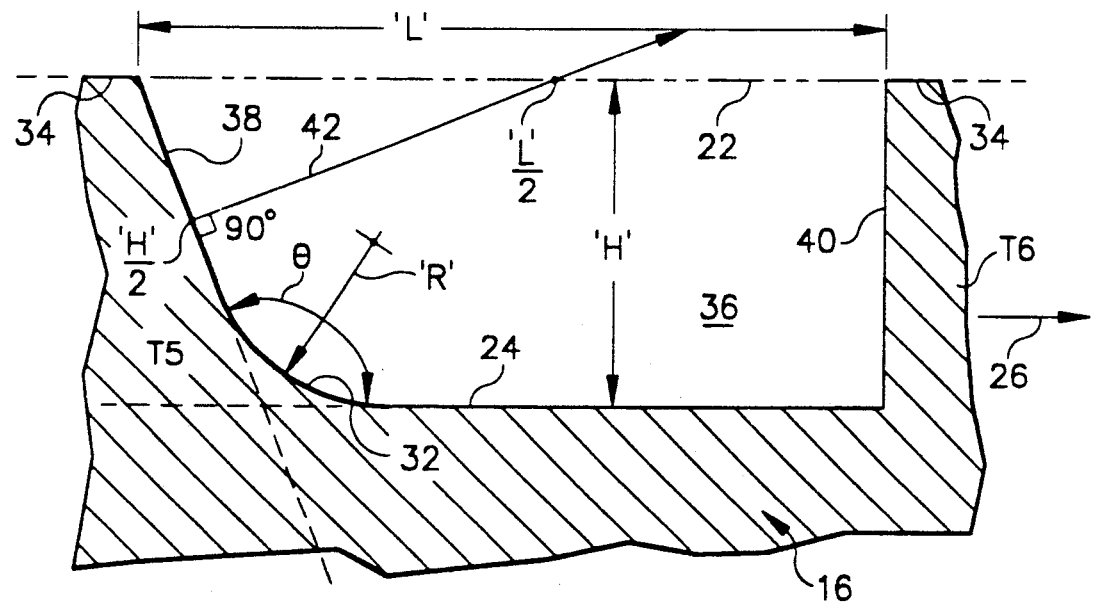
FIG. 2 is an enlarged portion of the apparatus of FIG. 1 illustrating the geometry of a downstream flank of a thread and the major axis of stress of the present invention.

Referring now to FIGS. 1 and 2, the material pushing threads, for example T5 and T6; each have a radial height 'H' extending normally from the minor circumference surface 24 of the screw to a crest 34. The crest 34 of each thread forms a portion of the major circumference path 22 of the screw 16; and as such; makes rotatable contact with the inner cylindrical wall 14 of the barrel 12. Adjacent threads, for example T5 and T6, are spaced axially from each other a desired maximum distance 'L'; and in part define a material holding cavity 36 (FIG. 2). As shown in FIG. 2, the cavity 36 has a maximum axial dimension 'L' and is bounded in part by the minor circumferential surface (MCS) 24; and by the major circumference path 22 which lies essentially along the inner cylindrical wall 14 of the barrel 12.

Relative to the direction of material flow 26, each thread, for example T5, T6, has a downstream material pushing flight/flank surface, for example surface 38 of thread T5. Each thread as such also has an upstream flight or flank surface, for example surface 40 of thread T6. As shown, the material pushing (downstream) flank surface 38 of each thread forms a material moving angle $\Theta$ with the minor circumference surface 24 of the screw 16.

In accordance with the present invention, in order to optimally increase the material flow rate of the extrusion apparatus 10, the material moving angle $\Theta$ is made greater than 90° and is optimized as follows. Where 'H' is the radial height of a downstream, material pushing flank 38 and 'L' is the maximum axial dimension of the material holding cavity 36, the optimal angle $\Theta$ is given by the equation:

$$\theta = \frac{\pi}{2} + \text{TAN}^{-1}\left(\frac{H}{L}\right) \text{radians}$$

In particular, given the dimension 'L' as measured at the crests 34 from the downstream surface 38 of thread T5 to the upstream surface 40 of the thread T6, the angle $\Theta$ should be optimized such that a major axis 42 for stress on the material pushing surface 38 lies on a line which is normal to a point 'H'/2 on such surface. Such a normal line should intersect the inner cylindrical wall 14 of the barrel 12 (or the major circumference path 22 of the screw 16,) desirably at a point 'L'/2 within a downstream material holding cavity, for example the cavity 36. As usual, the longer the axial dimension 'L' of the material holding cavity 36, the narrower the angle $\Theta$. In each case however, the overall stress field of the material pushing surface 38 will be optimally directed angularly towards the inner cylindrical wall 14 of the barrel 12, and hence away from surface 24.

Material M, for example a solid feed-plug of polymer resin, being pushed by the surface 38 as such, will tend to slide angularly within each cavity 36 towards the inner wall 14. As a result, the inner wall of the barrel 12 must exert a force against such material in order to retain it with the cavity and flow channel of the apparatus 10. The material moving angle $\Theta$ is optimal when material moving stresses are minimum on the minor circumferential surface (MCS) 24 of the screw, and maximum on the inner wall 14 of the barrel 12. This is contrary to prior art references which seek to equalize such stress or which fail to recognize or specify an angle at which to optimize a stress differential.

Further, in accordance with the present invention, in order to maximize forces between the material M and the inner wall 14 while minimizing those between such material and the surface 24 of the screw, the fillet or root portion 32 between the downstream flank 38 of each thread, e.g. T5, and the minor circumference surface 24, should be made large and concave. The radius 'R' of the concave root 32 as such should be within the range of $\frac{1}{4}$'H' to $\frac{1}{2}$'H'. The large concave root 32 as such also serves to reduce material wedging between downstream surface 38 and screw surface 24.

As can be seen an extrusion apparatus for extruding thermoplastic material has been provided. It enhances feed section performances, by maximizing the difference between barrel-to-material forces and material-to-screw forces. The design improvements of the apparatus of the present invention depend primarily on the pure geometry and mechanics of the apparatus and process, and not on the level or nature of friction factors between material and barrel or between material and screw. As such the material flow rate improvement of the present invention can be achieved for many different types of extrudable materials independently of friction factors involved.

Advantageously too, the unequal and greater stress of the present invention on the inner wall 14 of the barrel 12 forces material, for example a solid feed plug M of polymer, that has already melted to flow forcibly along the interface between the inner wall 14 and solid feed-plug M. Such forcible flow of the plug M leaves only a minimum layer of melted material on the barrel wall 14 thereby enabling the generation of a continuous high shear stress in such a thin layer. Such a high shear stress increases the overall force between the inner wall 14 and the rest of the solid feed-plug M, and thus increases feed-plug flow under such forces.

In addition, the greater stress and force between the inner wall 14 and feed-plug M also results in, or causes faster melting of material in the interface with the wall 14. Because of the viscosity of the melt film, the effective friction force in such interface are greatly increased, thereby adding to the maximization of the difference in forces at the barrel-material interface and material-screw interface. The end result is increased feed-plug flow and increased flow stability.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangements of components without departing from the spirit and scope of this disclosure. It is understood that the invention is not limited to the embodiments set forth herein for purposes of exemplification, but it is to be limited only by the scope of the attached claim or claims, including the full range of equivalency to which each element thereof is entitled.

The invention has therefore been described with reference to certain embodiments thereof, but is will be understood that variations and modifications can be effected within the scope of the invention.

What is claimed is:

1. An apparatus for extruding material in a given direction of material flow, the apparatus comprising:
    (a) a hollow barrel having an inner wall;
    (b) an extrusion screw mounted rotatably about an axis within said hollow barrel, said extrusion screw including pushing material threads, each said thread having a crest, a radial height 'H' and relative to the direction of material flow; a material pushing flank surface on the downstream side of each thread; said material pushing flank surface forming a material moving angle Θ of greater than 90° with the axis of rotation of said screw such that said material pushing flank surface has a maximum axial spacing 'L' along said inner cylindrical wall from the upstream surface of an adjacent downstream thread, and such that a line, normal to said material pushing flank surface at a point 'H'/2, will intersect said inner wall downstream of said pushing flank surface at a point 'L'/2 ; and
    (c) means for rotating said extrusion screw within said hollow barrel.

2. The apparatus of claim 1 wherein said material moving angle $$\theta = \frac{\pi}{2} + \text{TAN}^{-1}\left(\frac{H}{L}\right) \text{radians}.$$

3. The apparatus of claim 1 wherein said vertical height 'H' of each thread is measured normally radially from the minor circumference surface of said screw to said crest of each thread.

4. The apparatus of claim 1 wherein each root portion of each said downstream material pushing flank surface is concavely curved and has a large radius of within a range of ¼H to ½H.

5. The apparatus of claim 1 wherein the longer the axial dimension 'L' of a material holding cavity between adjacent threads, the narrower the material moving angle Θ.

6. The apparatus of claim 1 wherein said inner wall of said hollow barrel is generally cylindrical.

* * * * *